United States Patent
Götzelmann

(10) Patent No.: US 9,341,197 B2
(45) Date of Patent: May 17, 2016

(54) MODULAR SWITCHING VALVE ARRANGEMENT AND SWITCH CABINET WITH SUCH SWITCHING VALVE ARRANGEMENT

(75) Inventor: Joachim Götzelmann, Dörzbach (DE)

(73) Assignee: BUERKERT WERKE GMBH, Ingelfingen (DE)

( * ) Notice: Subject to any disclaimer, the term of this patent is extended or adjusted under 35 U.S.C. 154(b) by 227 days.

(21) Appl. No.: 14/009,257

(22) PCT Filed: Mar. 12, 2012

(86) PCT No.: PCT/EP2012/001098
§ 371 (c)(1),
(2), (4) Date: Oct. 1, 2013

(87) PCT Pub. No.: WO2012/130387
PCT Pub. Date: Oct. 4, 2012

(65) Prior Publication Data
US 2014/0202568 A1    Jul. 24, 2014

(30) Foreign Application Priority Data
Apr. 1, 2011  (DE) .................... 20 2011 004 741 U

(51) Int. Cl.
| F16B 35/00 | (2006.01) |
| F15B 13/08 | (2006.01) |
| F16K 27/00 | (2006.01) |
| F16K 27/12 | (2006.01) |

(52) U.S. Cl.
CPC ......... *F15B 13/0832* (2013.01); *F15B 13/0825* (2013.01); *F15B 13/0871* (2013.01); *F16K 27/003* (2013.01); *F16K 27/12* (2013.01); *Y10T 137/87885* (2015.04)

(58) Field of Classification Search
CPC ............. F15B 13/0825; F15B 13/0832; F15B 13/0871; F16K 27/12
USPC ................................... 137/271, 884; 411/395
See application file for complete search history.

(56) References Cited

U.S. PATENT DOCUMENTS

| 2,927,602 A * | 3/1960 | Eklund .......................... 137/343 |
| 2,931,387 A * | 4/1960 | Fleming ........................ 137/883 |
| 3,509,904 A * | 5/1970 | Olson ............................ 137/269 |
| 3,521,664 A * | 7/1970 | Medici .......................... 137/343 |

(Continued)

FOREIGN PATENT DOCUMENTS

| CN | 1854583 A | 11/2006 |
| WO | 2009127224 A1 | 10/2009 |

OTHER PUBLICATIONS

International Search Report mailed Jun. 8, 2012 for PCT/EP2012/001098.

(Continued)

*Primary Examiner* — Marina Tietjen
*Assistant Examiner* — Seth W Mackay-Smith
(74) *Attorney, Agent, or Firm* — Hauptman Ham, LLP

(57) ABSTRACT

A modular switching valve arrangement (12) having a plurality of switching valves (20) which are arranged adjacent to one another is characterized in that each switching valve (20) includes at least one media connection (34) which has a connecting piece (26) mounted thereto, and in that the connecting piece (26) braces the corresponding switching valve (20) with a shared carrier plate (24).

8 Claims, 4 Drawing Sheets

(56) References Cited

U.S. PATENT DOCUMENTS

| | | | |
|---|---|---|---|
| 4,570,674 A * | 2/1986 | Kaye | 137/624.18 |
| 4,908,733 A | 3/1990 | Zachrei et al. | |
| 5,238,017 A * | 8/1993 | Andersson et al. | 137/15.17 |
| 6,179,006 B1 * | 1/2001 | Stoll et al. | 137/884 |
| 6,629,546 B2 * | 10/2003 | Eidsmore et al. | 137/884 |
| 7,073,825 B2 * | 7/2006 | Takada et al. | 285/124.1 |
| 8,387,663 B2 * | 3/2013 | Iijima et al. | 137/884 |
| 8,905,077 B2 * | 12/2014 | Lundgren | 137/625.2 |
| 2002/0020445 A1 | 2/2002 | Hettinger | |
| 2010/0043891 A1 * | 2/2010 | Wilke et al. | 137/484.2 |

OTHER PUBLICATIONS

Chinese Office Action dated Feb. 2, 2015.
International Preliminary Report on Patentability for PCT/EP2012/001098.
Written Opinion for PCT/EP2012/001098 mailed Oct. 10, 2013.

* cited by examiner

MODULAR SWITCHING VALVE ARRANGEMENT AND SWITCH CABINET WITH SUCH SWITCHING VALVE ARRANGEMENT

CROSS REFERENCE TO RELATED APPLICATION

This application claims the priority of German Patent Application No. 20 2011 004 741.5, filed on Apr. 1, 2011 in the DPMA (German Patent and Trade Mark Office). Further, this application is the National Phase application of International Application No. PCT/EP2012/001098, which is incorporated herein by reference in its entirety.

The present invention relates to a modular switching valve arrangement including a plurality of switching valves which are arranged adjacent to one another. The present invention further relates to a switch cabinet including such a switching valve arrangement.

A switch cabinet including a switching valve arrangement is disclosed in WO 2009/127224 A1. In that document the switching valve arrangement is formed of a plurality of identical switching valves which are arranged so as to contact one another and are braced together by tension rods to form a block. This block can be installed in a switch cabinet such that the media connections of the switching valves are accessible through an opening in a wall of the switch cabinet. To this end, the block is fitted to the wall of the switch cabinet such that the media connections are positioned within the recess. For sealing purposes the front face of the block associated with the wall has a continuous groove provided thereon into which a seal can be placed.

A disadvantage of the known switching valve arrangement is that blocks that are formed of a comparatively large number of switching valves can not be reliably sealed against the wall of the switch cabinet. This is due to the fact that the block formed of the switching valves does not have a particularly high stability, especially when switching valves having plastic housings are used.

The object of the present invention consists in further developing a switching valve arrangement of the type initially mentioned to the effect that blocks can even be formed of a very large number of switching valves without the attachment of the switching valve arrangement to the switch cabinet becoming a problem. Furthermore, the switching valve arrangement is intended to be flexible to the effect that the individual switching valves can be exchanged with little effort.

To achieve this object, according to the invention provision is made in a switching valve arrangement of the type initially mentioned that each switching valve includes at least one media connection which has a connecting piece mounted thereto, and that the connecting piece braces the corresponding switching valve with a shared carrier plate. The invention is based on the fundamental idea of making use of the media connections for fitting the individual switching valves to a shared carrier plate. Two advantages are obtained in this way. For one thing, there are no sealing problems whatsoever because it is one continuous, stable carrier plate that needs to be sealed against the wall of the switching cabinet, rather than a multitude of individual switching valves. For another thing, the individual switching valves may be exchanged independently of each other since it is only required to release the connecting piece by which the respective switching valve is braced with the carrier plate. In the prior art, on the other hand, in order to be able to exchange one individual switching valve, all tension rods would need to be removed from the block which, as a result, would lose its integrity.

Preferably, provision is made that the connecting piece includes a thread which is screwed in the switching valve. In this way, the necessary pretensioning force can be applied with little effort.

Preferably, the connecting piece includes a surrounding shoulder which rests against the carrier plate. This allows the tensioning forces involved to be introduced into the carrier plate without any difficulty.

To enhance the sealing action, a seal may be arranged between the shoulder and the carrier plate.

Preferably, provision is made that on the side facing away from the switching valves, the carrier plate includes a depression having the connecting pieces arranged therein. This depression ensures that in the fully assembled condition, the connecting pieces do not protrude at all or protrude only slightly over the outer surface of the switch cabinet, so that a compact structure is obtained.

According to a preferred embodiment of the invention, provision is made that the connecting pieces are part of a quick-connect coupling by which a tube or hose can be connected to the connecting piece. This makes it easier to connect tubes or hoses to, and possibly also disconnect them from, the switching valves.

To achieve the above-mentioned object, provision is also made according to the invention for a switch cabinet including such a switching valve arrangement, at least one mounting wall for the switching valve arrangement being provided which is provided with a recess, the recess being covered by the carrier plate. This allows the switching valve arrangement to be mounted in the switch cabinet with little effort, so that the connecting pieces are accessible from outside. The special advantage of this configuration as compared with a large number of conventional switching cabinets resides in that the tubes or hoses for connecting the switching valves need not be arranged and guided in the interior of the switching cabinet.

According to one configuration of the invention, provision is made that the carrier plate is arranged on the inside of the mounting wall. This allows the recess in the mounting wall of the switch cabinet to be made very small since the switching valves combined into a block need not extend through the recess.

Preferably, provision is made that a faceplate is arranged on the outside of the mounting wall. The faceplate serves as a reinforcement of the mounting wall of the switch cabinet, so that the mounting wall can be made very thin while the necessary tensioning forces can still be reliably absorbed.

The invention will now be described below with reference to an embodiment which is illustrated in the accompanying drawings, in which:

FIG. 1 schematically shows a switch cabinet according to the invention, with a switching valve arrangement installed therein;

FIG. 2 shows an exploded view of the switch cabinet of FIG. 1;

FIG. 3 schematically shows a front view of a switch cabinet, with a switching valve arrangement installed therein;

FIG. 4 schematically shows a top view of the switching valve arrangement of FIG. 3;

Figure 1:
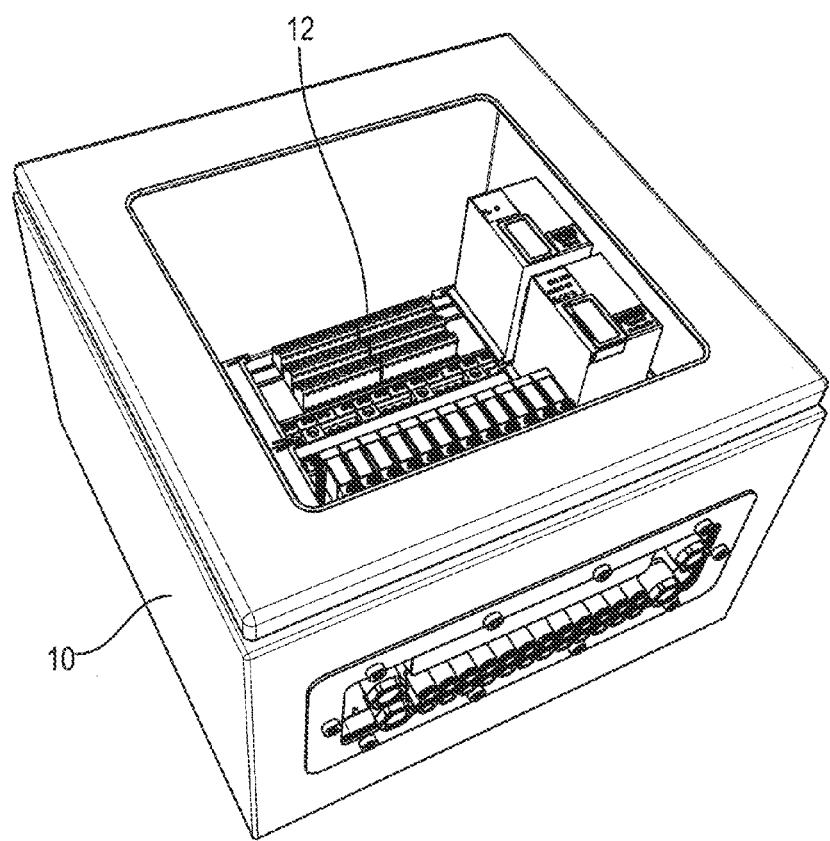
Figure 2:
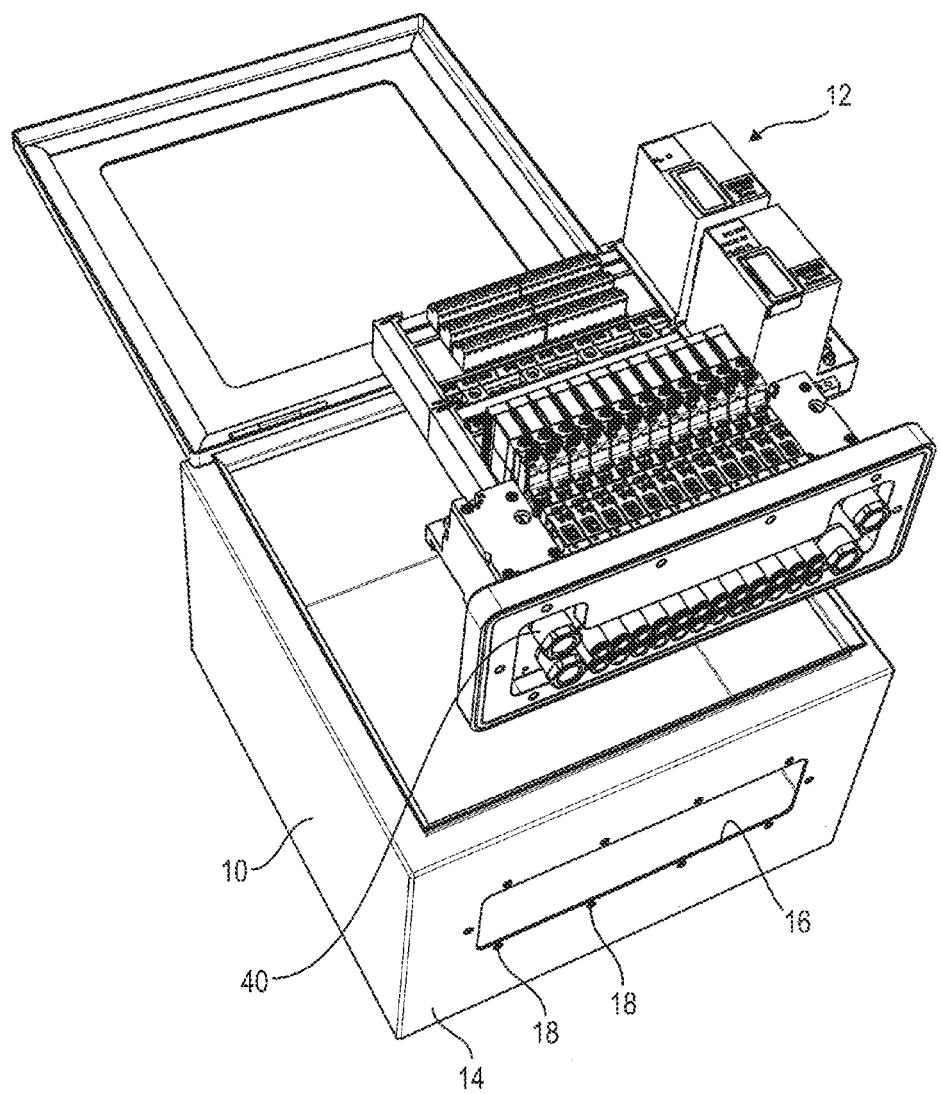
Figure 3:
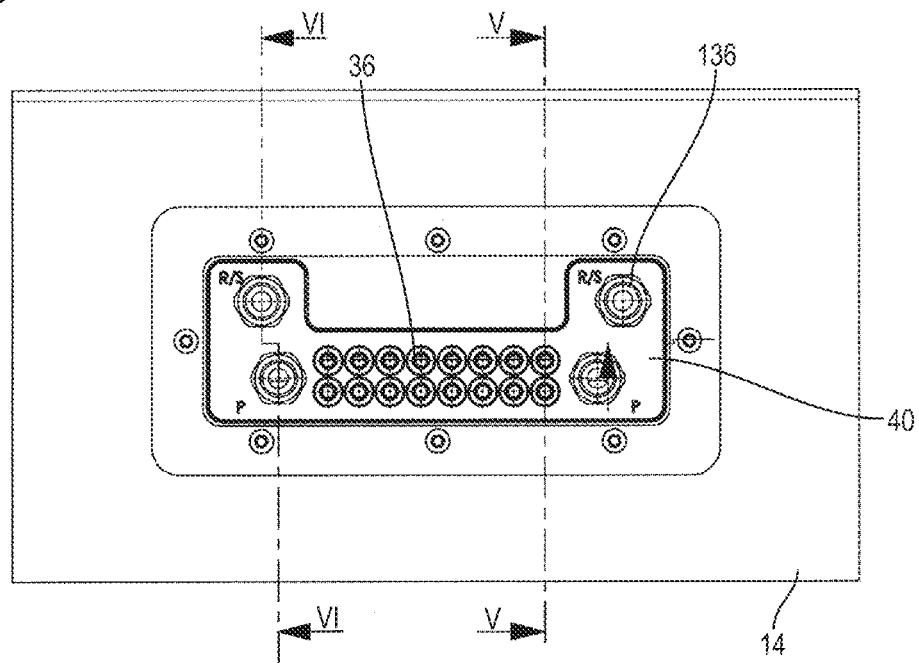

FIG. 1 shows a switch cabinet 10 having a switching valve arrangement 12 (see also FIG. 2) arranged in the interior thereof. The switch cabinet 10 has a mounting wall 14 provided with a recess 16. Provided along the edge of the recess 16 is a plurality of drilled holes 18 for fastening screws.

Figure 4:
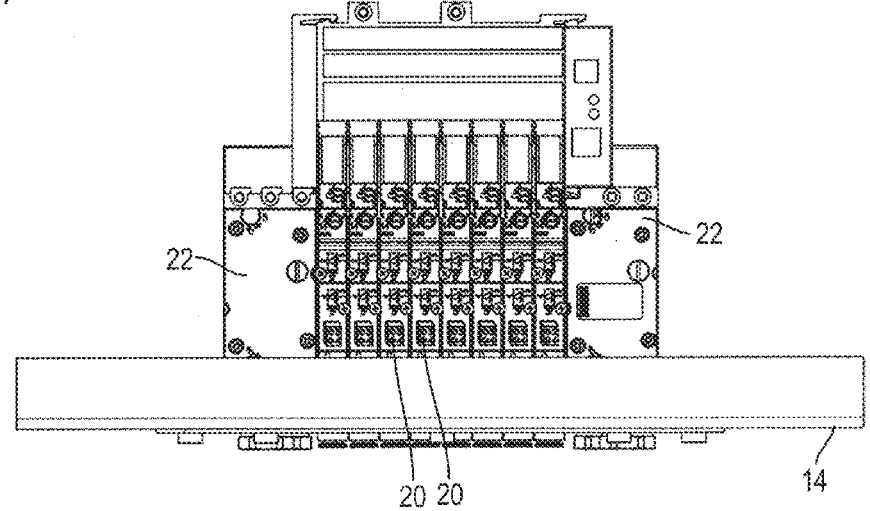

The switching valve arrangement 12 consists of a plurality of switching valves 20 (see also FIG. 4) which are combined to form a block, contacting each other by their respective side faces. The switching valves 20 each include a drive and a fluid housing connected therewith. Optionally, a plurality of fluid housings may be firmly connected with a fluid module, the fluid module serving for the supply and discharge of media.

Control modules 22 are arranged on two outer faces of the block formed in this way. The switching valves 20 are arranged on a carrier plate 24 along with the control modules 22 (see also FIGS. 5 and 6). The carrier plate 24 is made of metal, for example stainless steel or an aluminum alloy, and has a thickness that is very much greater than that of the mounting wall 14. This results in a high mechanical stability of the carrier plate 24. Alternatively, the carrier plate 24 may also be produced from other materials, such as, e.g., a plastic material.

Figure 5:
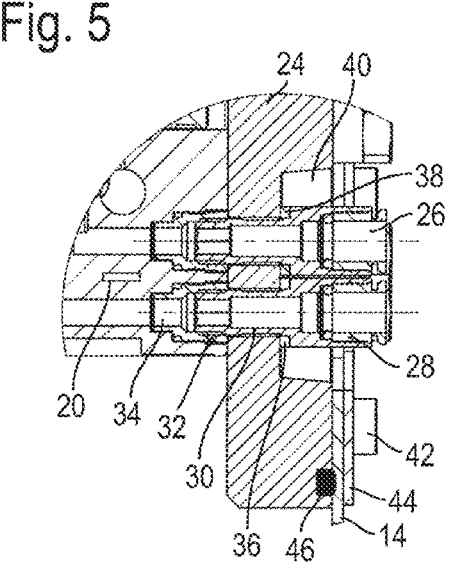
FIG. 5 shows a section taken along the line V-V of FIG. 3.
Figure 6:
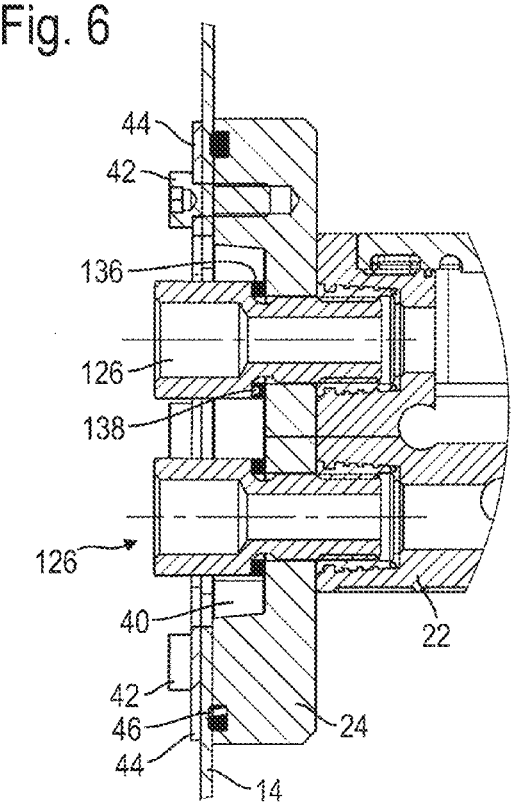
FIG. 6 shows a section taken along the plane VI-VI of FIG. 3.
Figure 7:
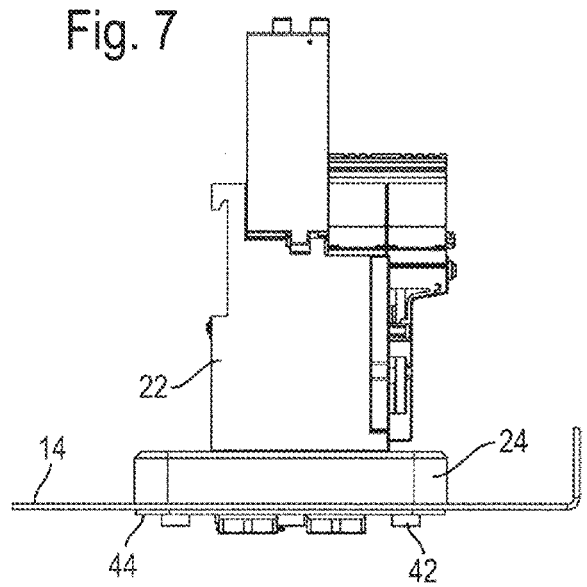
FIG. 7 shows a side view of the switching valve arrangement of FIG. 3.

To connect the switching valves 20 with the carrier plate 24, provision is made for connecting pieces 26, as shown in FIG. 5, which each have an external connecting sleeve 28, a neck 30, and a thread 32 at the end facing away from the connecting sleeve 28. The thread 32 is screwed in a mating thread which is provided on a respective media connection 34 of the switching valve 20. As an alternative, the media connections 34 are arranged in the optional fluid module.

Provided between the connecting sleeve 28 and the neck 30 is a shoulder 36 which extends in the radial direction and, via an interposed seal 38, rests against the outside, facing away from the switching valves 20, of the carrier plate 24. The connecting pieces 26 are screwed into the media connections 34 of the switching valves 20 so far that they are firmly braced with the carrier plate 24. A media-tight passage from the connecting pieces 26 to the media connections 34 is ensured here, so that there is no need to adjust the carrier plate 24 with respect to its chemical and electrochemical properties to the media switched by the switching valves.

Similar connecting pieces 126 lead to the control modules 22, the connecting pieces 126 mechanically clamping the control modules 22 firmly to the carrier plate 24 via shoulders 136.

The connecting pieces 26, 126 make sure that the switching valves 20 and the control modules 22 are mechanically reliably attached to the carrier plate 24. Here, the connecting pieces 26, 126 may be guided in the carrier plate 24 virtually free from play in the manner of fitted bolts. To prevent the connecting pieces from excessively protruding outwards, the carrier plate is provided with a depression 40 on the side facing away from the switching valves 20, the shoulders 36, 136 resting on the bottom of the depression 40.

The carrier plate 24 is applied from the inside of the switch cabinet 10 to the mounting wall 14 such that the connecting pieces 26, 126 are located within the recess 16. Then the carrier plate 24 is screwed down by means of fastening screws 42 which extend through the drilled holes 18. A faceplate 44, which serves as a mechanical reinforcement, is further placed underneath on the outside of the mounting wall 14. A seal 46 is arranged on the inside of the mounting wall 14 between the carrier plate 24 and the mounting wall and serves to seal the interior space of the switch cabinet 10.

The connecting pieces 26, 126 are accessible from the outside of the switch cabinet (see in particular FIG. 1), so that it is not required to guide any tubes or hoses whatsoever in the interior of the switch cabinet. This results in a compact and clear structure. Preferably, the connecting pieces 26 are configured as part of a quick-connect coupling, so that the media hoses can be connected to the switching valves 20 with little effort.

The invention claimed is:

1. A modular switching valve arrangement, comprising:
   a plurality of switching valves which are arranged adjacent to one another,
   wherein each of the switching valves includes at least one media connection which has a connecting piece mounted on the media connection,
   wherein the connecting piece braces the corresponding switching valve with a shared carrier plate, and
   wherein the connecting piece includes a thread which is screwed in the corresponding switching valve.

2. The switching valve arrangement according to claim 1, wherein the connecting piece includes a surrounding shoulder which rests against the carrier plate.

3. The switching valve arrangement according to claim 2, further comprising a seal which is arranged between the shoulder and the carrier plate.

4. The switching valve arrangement according to claim 1, wherein, on a side facing away from the switching valves, the carrier plate includes a depression having the connecting pieces arranged therein.

5. The switching valve arrangement according to claim 1, wherein the connecting piece is part of a quick-connect coupling by which a hose is connectable to the connecting piece.

6. A switch cabinet, comprising:
   a modular switching valve arrangement comprising:
      a plurality of switching valves which are arranged adjacent to one another,
      wherein each of the switching valves includes at least one media connection which has a connecting piece mounted on the media connection, and
      wherein the connecting piece braces the corresponding switching valve with a shared carrier plate; and
   at least one mounting wall for the modular switching valve arrangement, the at least one mounting wall being provided with a recess,
   wherein the recess is covered by the carrier plate.

7. The switch cabinet according to claim 6, wherein the carrier plate is arranged on the inside of the mounting wall.

8. The switch cabinet according to claim 7, further comprising a faceplate which is arranged on the outside of the mounting wall.

* * * * *